United States Patent [19]
Cartwright et al.

[11] Patent Number: 5,929,325
[45] Date of Patent: Jul. 27, 1999

[54] SYSTEM FOR CONTAINING AND HANDLING TOXIC GAS AND METHODS FOR CONTAINING AND HANDLING SAME

[75] Inventors: Ronald H. Cartwright, Oviedo; Dennis Havlin, Bokeelia, both of Fla.

[73] Assignee: The Dumont Company, Inc., Ft. Myers, Fla.

[21] Appl. No.: 09/006,069

[22] Filed: Jan. 12, 1998

[51] Int. Cl.[6] .......................... B65D 90/04; B65D 25/18; G01M 3/32; G08B 21/00
[52] U.S. Cl. .............................. 73/49.2; 73/40; 220/4.12; 588/16
[58] Field of Search ...................... 73/49.2, 40; 220/415, 220/425, 469, 403, 4.12, 565; 340/605; 588/16

[56] References Cited

U.S. PATENT DOCUMENTS

| | | | |
|---|---|---|---|
| 3,848,765 | 11/1974 | Dürkop | 220/9 A |
| 4,183,221 | 1/1980 | Yamamoto | 62/45 |
| 4,822,743 | 4/1989 | Wegrzyn | 436/3 |
| 4,911,326 | 3/1990 | McGouran, Jr. | 220/445 |
| 4,912,966 | 4/1990 | Sharp | 73/49.2 |
| 4,973,946 | 11/1990 | Cowden, II | 340/605 |
| 4,989,447 | 2/1991 | Gelin | 73/49.2 |
| 4,990,317 | 2/1991 | Mak et al. | 423/215.5 |
| 5,033,638 | 7/1991 | Cruver et al. | 220/571 |
| 5,072,623 | 12/1991 | Hendershot | 73/49.2 |
| 5,096,006 | 3/1992 | Howard | 177/134 |
| 5,096,087 | 3/1992 | Thomas | 220/561 |
| 5,117,677 | 6/1992 | Hendershot et al. | 73/49.2 |
| 5,143,244 | 9/1992 | Kauffman | 220/445 |
| 5,167,142 | 12/1992 | Sharp | 73/49.2 |
| 5,201,435 | 4/1993 | Harding et al. | 220/415 |
| 5,249,698 | 10/1993 | Cruver et al. | 220/565 |
| 5,251,473 | 10/1993 | Reese | 73/49.2 |
| 5,282,546 | 2/1994 | Bauer | 220/565 |
| 5,285,914 | 2/1994 | Del Zotto | 220/4.12 |
| 5,299,709 | 4/1994 | Beerbower et al. | 220/445 |
| 5,335,815 | 8/1994 | Josselyn | 220/445 |
| 5,450,978 | 9/1995 | Crisp et al. | 220/565 |
| 5,495,695 | 3/1996 | Elliott, Jr. | 52/20 |
| 5,582,310 | 12/1996 | Del Zotto | 220/4.12 |
| 5,589,631 | 12/1996 | Spring et al. | 73/49.2 |
| 5,704,965 | 1/1998 | Tom et al. | 95/95 |
| 5,741,465 | 4/1998 | Gregg | 422/189 |

*Primary Examiner*—Hezron Williams
*Assistant Examiner*—J David Wiggins
*Attorney, Agent, or Firm*—Allen, Dyer, Doppelt, Milbrath & Gilchrist, P.A.

[57] ABSTRACT

A system, container, and methods are provided for containing and handling a toxic gas. The system preferably includes a first container having toxic gas stored therein and a second container including a base and a lid mounted to the base when in a closed position thereby forming an interstitial space therebetween, which base and lid are sealed against leaks out of the second container by a sealing material that may visibly indicates leaks by visibly changing color in response to contact with any toxic gas that has leaked into the interstitial space, or which container system may include a toxic gas sensor or pressure sensor for detecting presence of leakage gas within the interstitial space. The base has an inner chamber formed therein, and the first container is preferably mounted in the inner chamber so that an interstitial space is formed around at least portions of the first container. The system also preferably includes a toxic gas use remover connected to the first container and extending through the second container for removing toxic gas from the first container for use and a toxic gas detoxifying remover connected to the second container for removal of toxic gas when located within the interstitial space of the second container and for detoxifying the toxic gas thereafter.

47 Claims, 4 Drawing Sheets

SYSTEM FOR CONTAINING AND HANDLING TOXIC GAS AND METHODS FOR CONTAINING AND HANDLING SAME

FIELD OF THE INVENTION

The present invention relates to the field of environmentally toxic elements and, more particularly, to the field of containing and handling such environmental elements.

BACKGROUND OF THE INVENTION

In the past, the handling of toxic liquids and gases had not been a great concern as the population of the world was much less and the world was being explored and mapped. Over the years, however, it became more evident that the world was of a limited size and disposing of toxic liquids into rivers and oceans and toxic gases into the atmosphere became increasingly problematic. Recently, land use and sale of land has become more and more regulated by federal, state and local environmental laws and regulations which often pass liability for environmental problems to previous owners and users of land. Also, the public in general has become more and more concerned about environmental problems and is often in fear of potential environmental hazards such as the disposal and handling of toxic or dangerous elements. Often in industry this has even caused a backlash so that any time a potential environmental problem is even at issue companies and businesses tend to shy away from even addressing the problem due to the fear of liability if they become involved as the owner or user of land or a supplier of systems for handling such potentially toxic elements.

This requirement for storing and handling of some types of toxic gases, e.g., chlorine gas, are even more common. Chlorine gas, for example, is commonly used to disinfect or sterilize water. The use of chlorine can be an important factor in controlling diseases, e.g., cholera, typhoid, and is generally more economical and effective in a gas state. Conventionally, above ground storage tanks are used for containing such gases, but leaks can occur with such tanks. One potential solution is to attempt to confine the leak in or from an above-ground storage tank to a room or building so that leaked gas does not escape from the room. Such a system, however, can be expensive and cumbersome. Also, such a system potentially exposes an operator within or needing to enter the room to the leaked gas.

Another potential solution is to attempt to bury or story a container underground such as illustrated in U.S. Pat. No. 5,096,006 by Howard titled "Apparatus For Storing Chlorine Gas." An underground storage system, however, can be cumbersome because of the confined location and is not readily mobile to various desired location sites. Also, such a system does not readily address detoxifying the gas or reusing the leaked gas for a desired application.

SUMMARY OF THE INVENTION

In view of the foregoing, the present invention advantageously provides an effective and simple system and method to containing and handling toxic gases such as may be present in light to heavy industrial areas or light to heavy service areas where such toxic gases may be used. The present invention also advantageously provides an above-ground system for containing and handling toxic gases especially where such gases potentially leak from containers which are used for dispensing toxic gases such as in light and heavy industrial and service oriented industries. The present invention additionally provides warning and indication for users and handlers of toxic gases when the leak occurs and provides for disposal of and/or reuse of leaked toxic gas. The system further advantageously provides an above-ground container for a system for containing and handling toxic gases which confines the gas to a limited area that can then be readily removed so that the environmental impact is substantially reduced.

More particularly, the present invention provides an above-ground system for containing and handling a toxic gas that preferably has a first container having toxic gas, e.g., chlorine gas, stored therein and a second container including a base and a lid mounted to the base when in a closed position. The base preferably includes at least portions of an inner chamber formed therein. The first container is preferably mounted in the at least portions of the inner chamber so that an interstitial space is formed around at least portions of the first container. The system also preferably has toxic gas use removing means connected to the first container and extending through the second container for removing toxic gas from the first container for use and toxic gas detoxifying removing means connected to the second container for removing toxic gas when located within the interstitial space of the second container and for detoxifying the toxic gas thereafter.

According to an aspect of the present invention, a system can also include weight determining means associated with the second container for determining the amount of toxic gas removed from the first container for use by weight or for determining detoxification amount by weight. The base of the second container also preferably has a bottom and a plurality of side walls connected to and extending upwardly from the bottom so as to define the at least portions of the inner chamber and a plurality of openings formed in only one of the plurality of side walls. In other words, the other side walls are preferably devoid of openings formed therein. The toxic gas use removing means and the toxic gas detoxifying removing means each preferably extend through only one of the plurality of openings.

According to another aspect of the present invention, a system can further include the second container further having a first sealing material or sealing member abuttingly contacting the lid and the base for sealing the lid to the base. A second sealing material, for example, can also abuttingly contacting outer peripheries of the plurality of openings and at least portions of the toxic gas use removing means and the toxic gas detoxifying means for sealing the same in the only plurality of openings of the only one side wall of the plurality of side walls of the base. Advantageously, the first and/or second sealing materials can also include color changing means associated with each of the first and second sealing materials for visibly changing color responsive to contact with toxic gas when located in the inner chamber of the base.

According to a further aspect of the present invention, a system preferably includes a toxic gas sensor associated with the inner chamber of the second container for sensing leakage of toxic gas from the first container into the interstitial space of the second container. The toxic gas sensor, for example, is preferably a pressure sensor associated with the interstitial space. The system also can include the toxic gas sensor being a first toxic gas sensor, e.g., by pressure, and a second toxic gas sensor associated with the exterior of the second container. Additionally, the system preferably includes alarm generating means associated with toxic gas detoxifying removing means for generating an alarm responsive to at least one toxic gas sensor sensing toxic gas within the interstitial space of the second container. Further, for example, one or more of the toxic gas sensors can advantageously activate or trigger detoxification portions of the system, e.g., toxic gas detoxifying removing means, of the system.

The present invention also advantageously provides a container for containing toxic gas therein. The container preferably includes a base. The base has a bottom and a plurality of side walls connected to and extending upwardly from the bottom so as to define at least portions of an inner chamber for positioning a tank of toxic gas therein. Only one of the plurality of side walls of the base has a toxic gas removal region associated therewith for both removal of toxic gas from the tank and removal of any toxic gas leaking into the inner chamber. A lid is preferably mounted to upper peripheries of the plurality of side walls and preferably provides a closure to the at least portions of the inner chamber. The container also preferably has a first sealing material abuttingly contacting the lid and the base for sealing the lid to the base.

According to other aspects of a container according to the present invention, the container can also include the toxic gas removal region having a pair of openings formed in the only one of the plurality of side walls of the base. A second sealing material can abuttingly contact outer peripheries of each of the plurality of openings for sealing the same in the plurality of openings of the only one side wall of the plurality of side walls of the base. Also, the first and second sealing materials can include color changing means associated with each of the first and second sealing materials for visibly changing color responsive to contact with toxic gas when located in the inner chamber of the base. Additionally, the lid can flexibly and abuttingly contact the first sealing material for providing a flexible and secure seal with the base when the lid is in the closed position. The toxic gas within the tank of toxic gas is at a predetermined pressure, and the lid preferably has a weight or sealing strength greater than the predetermined pressure within the tank so that if toxic gas leaks from the tank. The toxic gas at the predetermined pressure is then advantageously confined to the inner chamber of the container.

The present invention also advantageously includes methods of containing and handling toxic gas. A method of containing and handling a toxic gas preferably includes positioning a first container having toxic gas stored therein within an inner chamber of a second container so that an interstitial space is formed around at least portions of the first container. The second container includes a base and a lid mounted to the base when in a closed position. The base has the inner chamber formed therein. The method also preferably includes removing toxic gas from the first container through an opening formed in the second container for use related to an external application, removing toxic gas leaked from the first container when located within the interstitial space of the second container, and detoxifying the removed toxic gas thereafter.

Another method of containing and handling a toxic gas preferably includes positioning a first container having toxic gas stored therein within an inner chamber of a second container so that an interstitial space is formed around at least portions of the first container. The second container includes a base and a lid mounted to the base when in a closed position. The base has at least portions of the inner chamber formed therein. The method also preferably includes removing toxic gas from the first container through a first opening formed in a side wall of the base of the second container for use related to an external application and removing toxic gas leaked from the first container when located within the interstitial space of the second container through the same side as the first opening formed in the second container, e.g., through the same first opening or through a second opening formed in the same side.

Still another method of containing and handling a toxic gas preferably includes positioning a first container having toxic gas stored therein within an inner chamber of a second container so that an interstitial space is formed around at least portions of the first container. The second container has a base and a lid mounted to the base when in a closed position. The base has the inner chamber formed therein. The method preferably also includes sensing leakage of toxic gas from the first container into the interstitial space of the second container and removing toxic gas leaked from the first container responsive to the sensed leakage of toxic gas into the interstitial space of the second container through an opening formed in the base of the second container.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings which illustrate preferred embodiments of the invention. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, the prime notation, if used, indicates similar elements in alternative embodiments.

Figure 1:
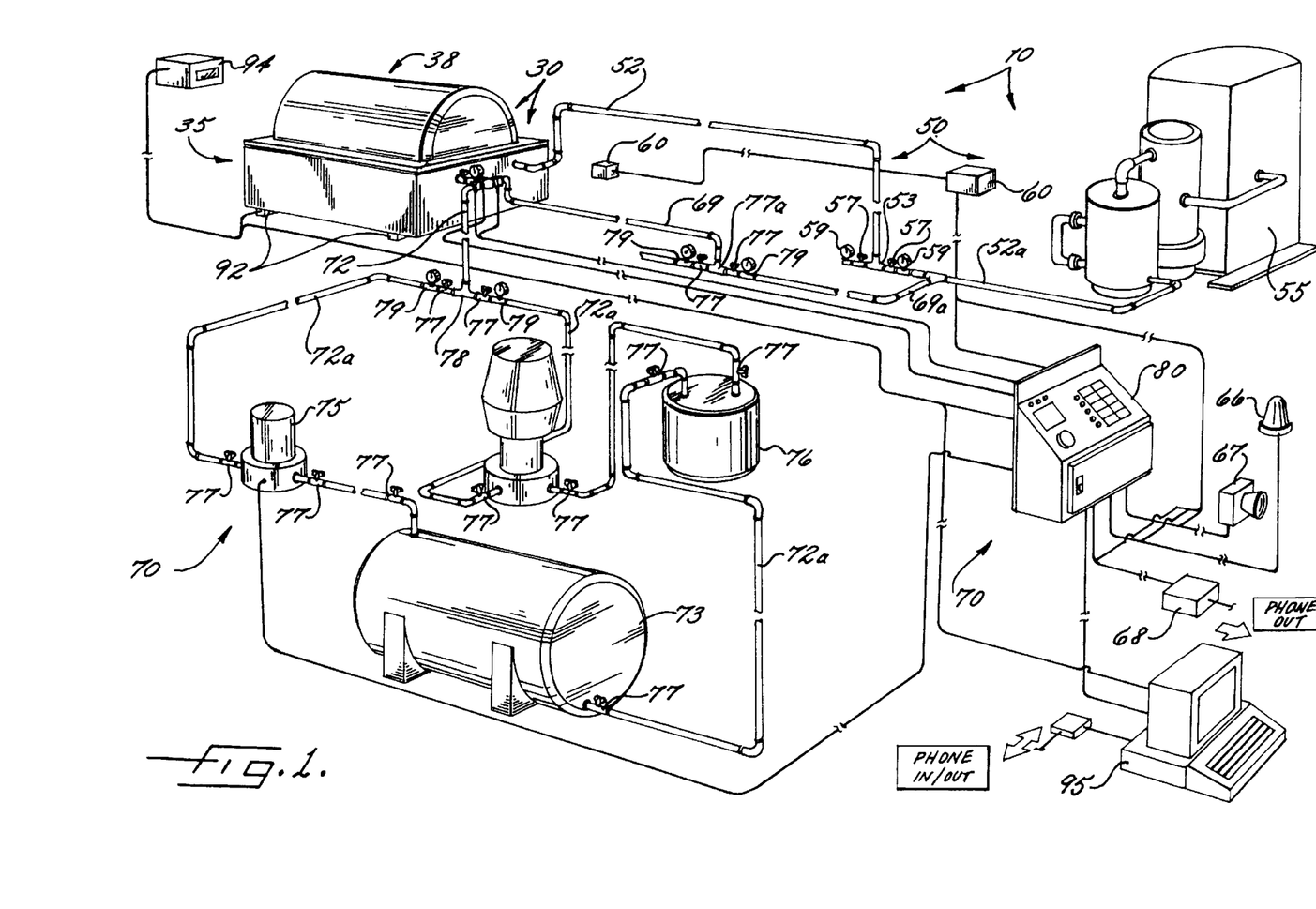
FIG. 1 is a perspective view of a system for containing and handling a toxic gas according to the present invention.
Figure 2:
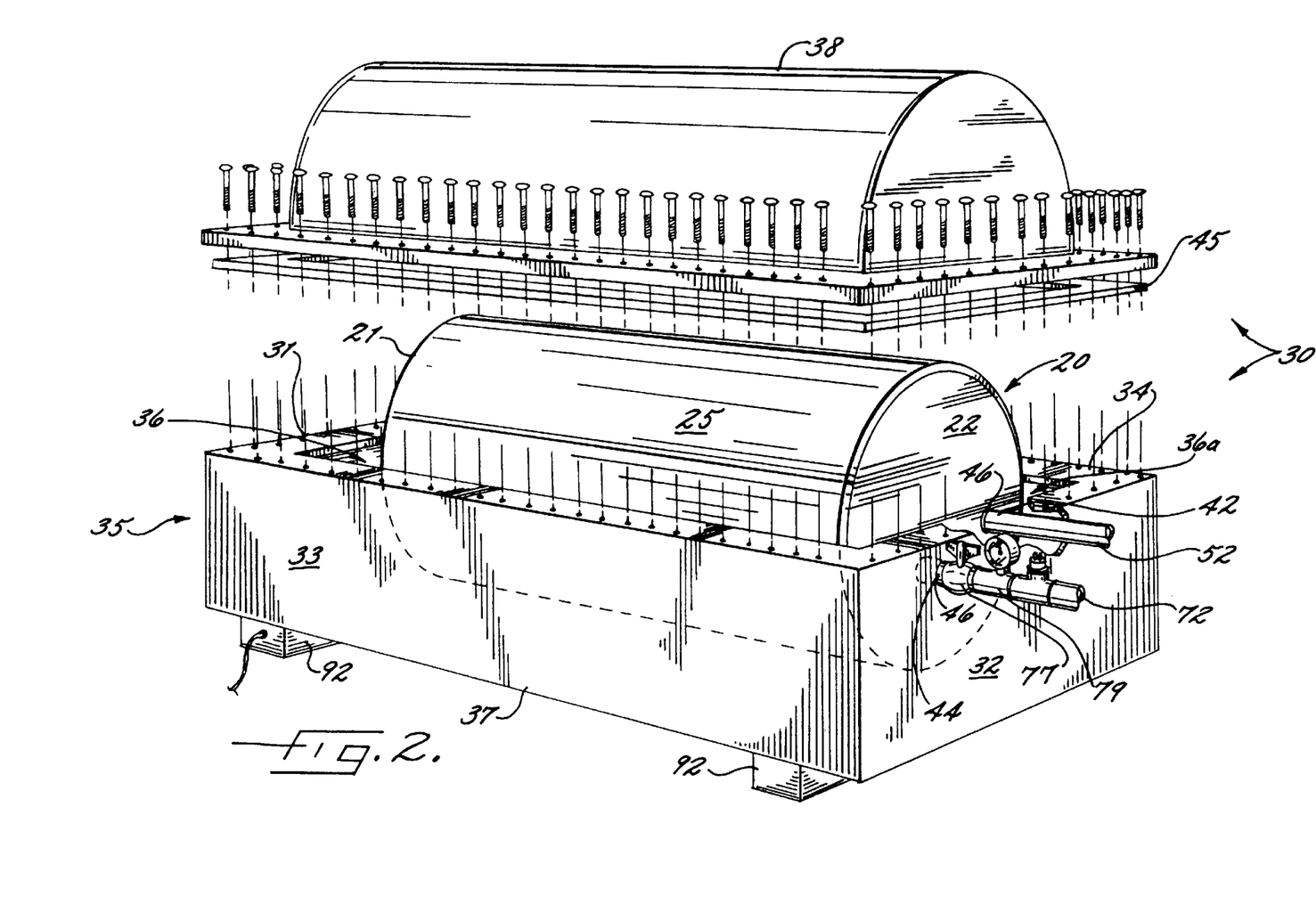
FIG. 2 is an exploded perspective view of a container for containing a toxic gas of a system for containing and handling toxic gas according to the present invention.
Figure 3:
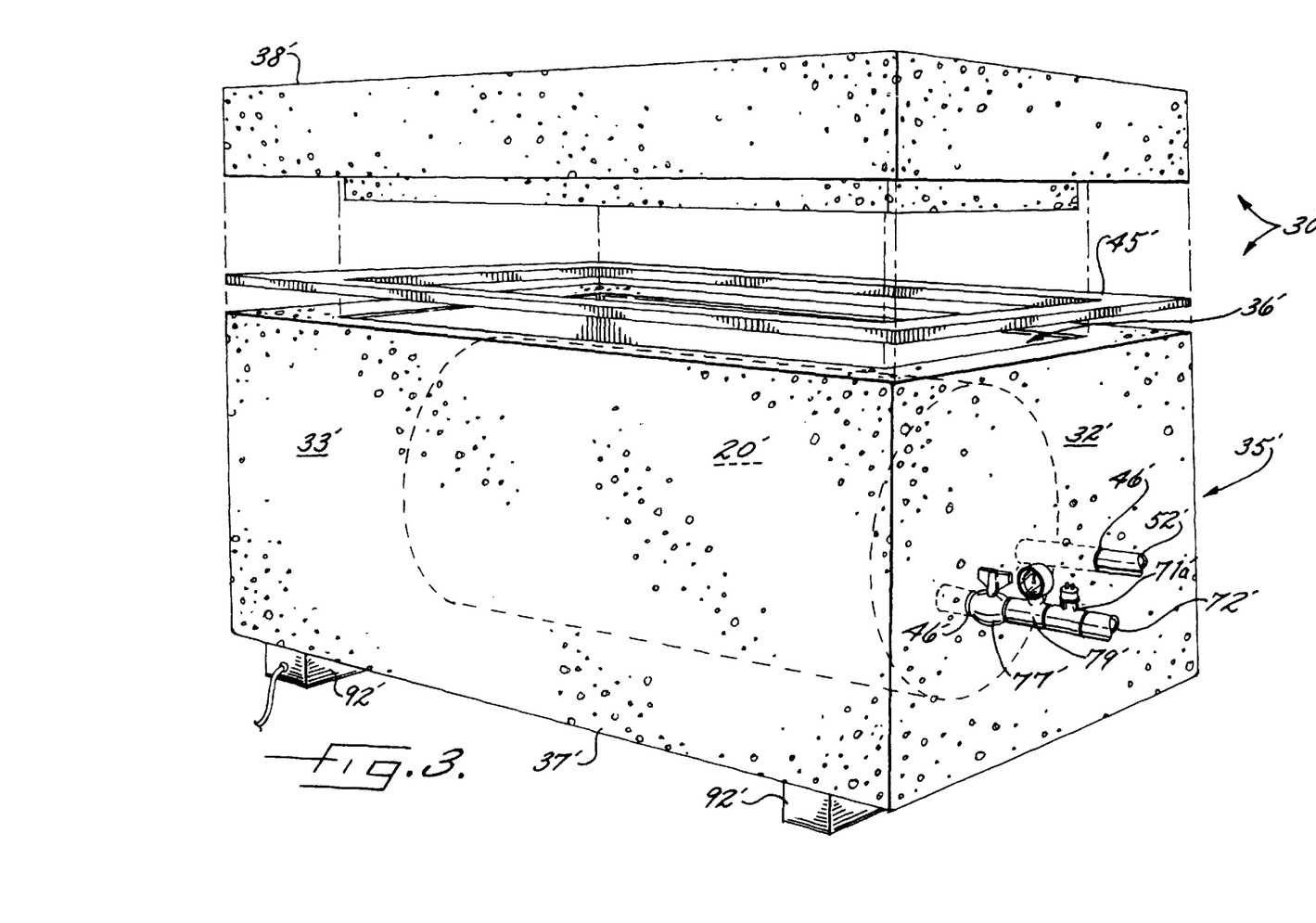
FIG. 3 is an exploded perspective view of an alternate embodiment of a container for containing a toxic gas of a system for containing and handling toxic gas according to the present invention.

FIG. 1 illustrates a perspective view of an above-ground system 10 for containing and handling a toxic gas according to the present invention. The system 10 preferably has a first container 20 having toxic gas, such as chlorine gas, stored therein and a second container 30 including a base 35 and a lid 38 or lid member mounted to the base 35 when in a closed position (see also FIG. 2). The first container 20, for example, can have a generally cylindrical shape, e.g., having a pair of circular-shaped end walls 21, 22 and a tubular body 25, and a and can be formed of a metallic material such as steel. As understood by those skilled in the art, these types of containers or tanks are commonly used to store and transport toxic gases such as chlorine gas. The base 35 of the second container 30 preferably includes at least portions of an inner chamber 36 formed therein. As illustrated in FIG. 1, for example, the lid 38 can be shaped to form other portions of the inner chamber 36. The lid 38 is preferably attached, fastened, or secured to the base 35 by a plurality of clamping devices, spaced-apart bolts, or other attaching means extending along at least peripheral portions of the lid 38 so that the lid closingly withstands pressure from any gas leaked from the first container 20, e.g., the toxic gas being in the first container at some desired or predetermined pressure. Alternatively, as illustrated in FIG. 3, the lid 38' may merely provide the closure for the inner chamber 36' and the base 35' would substantially form all of the inner chamber 36'.

In the embodiments illustrated, the first container 20 is preferably mounted in the inner chamber 36 of the second container 30 so that an interstitial space 36a is formed around at least portions of the first container 20. The base 35 of the second container 30 also preferably has a bottom 37 and a plurality of side walls 31, 32, 33, 34, e.g., two or more, connected to and extending upwardly from the bottom 37 so as to define the inner chamber 36 and a plurality of openings, e.g., preferably only two openings, 42, 44, formed in only one of the plurality of side walls 32. In other words, the other side walls 31, 33, 34 are preferably devoid of openings formed therein. It will also be understood by those skilled in the art that the side walls 31, 32, 33, 34 include end, side, or other various shaped and sized walls generally as illustrated and described.

The system 10 also preferably has toxic gas use removing means 50 connected to the first container 20 and extending through the second container 30 for removing toxic gas from the first container 20 for use associated with a desired application of the gas. Toxic gas detoxifying removing means 70 is preferably connected to the second container 30 for removing toxic gas when located within the interstitial space of the second container 30 and for detoxifying the toxic gas thereafter. The toxic gas use removing means 50 and the toxic gas detoxifying removing means 70 preferably each extend through only one of the plurality of openings 42, 44 respectively.

The toxic gas use removing means 50 is preferably provided by a conduit 52 or other piping connected to the first container 20 and extending through an opening in the second container 30 and is introduced to fluid, e.g., preferably a liquid such as water or waste depending on the application, by an injector or injecting device 53 in fluid communication with a pump (not shown) or vacuum pressure for withdrawing toxic gas form the first container 20 through the conduit 52. The toxic gas use removing means 50 can also include one or more valves 57 and gauges 59 to assist in directing gas flow and in measuring fluid pressure within the system 10 at desired locations. With chlorine gas, for example, the conduit 52 can extend to a normal chlorination system 55 as understood by those skilled in the art. The toxic gas use moving means 50 also includes additional conduit 52a having a liquid or other fluid as described above circulating or flowing therethrough.

Figure 4:
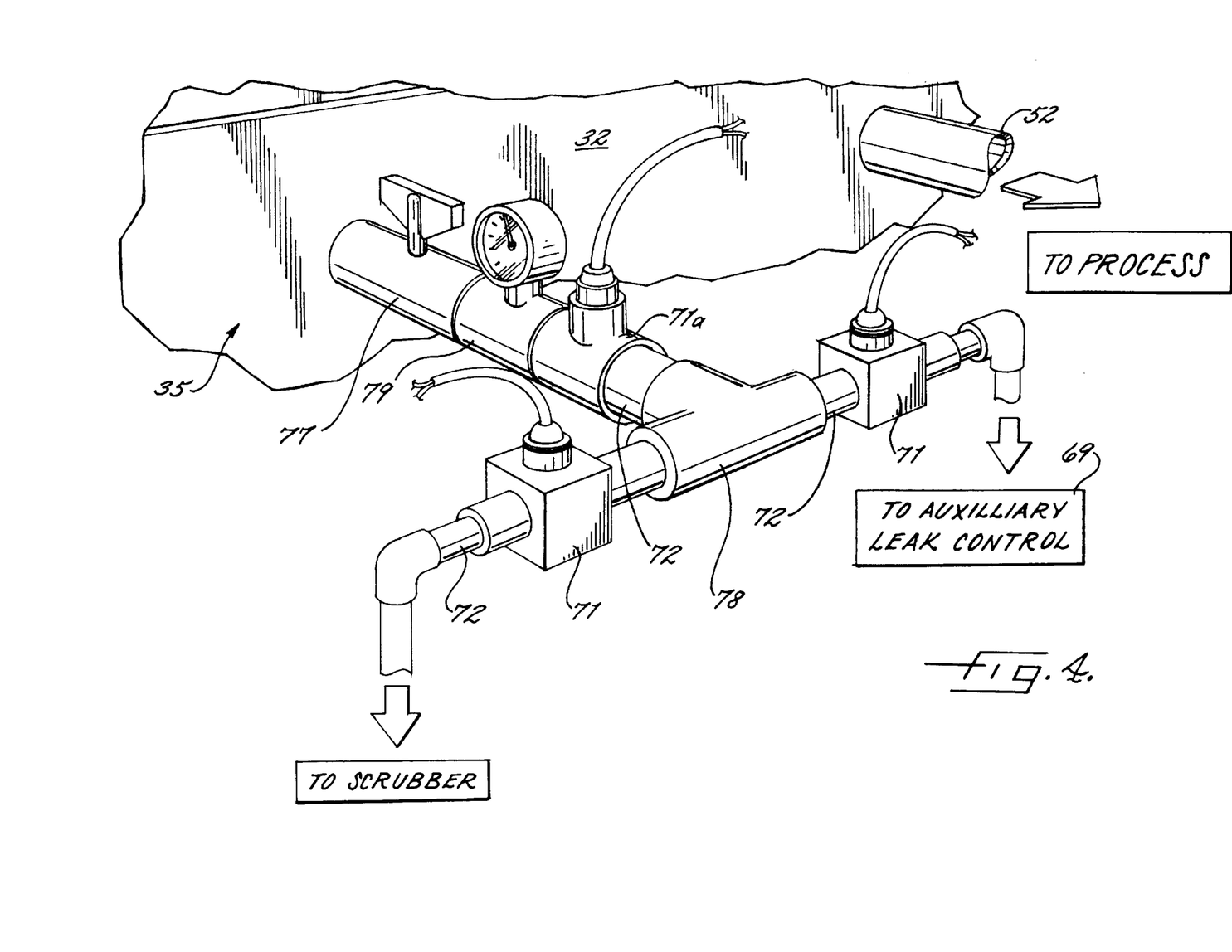
FIG. 4 is a perspective view of a manifold of a container and system for containing and handling a toxic gas according to the present invention.

The toxic gas detoxifying removing means 70, for example, can include a conduit 72 or other piping to remove or withdraw toxic gas from the interstitial space by vacuum or pressure to an injector or injecting device 78, 77a that is in fluid communication with a pump 75 and is pumped through the detoxifying removing means, e.g., a detoxification portion of the system, by means of a conduit 72a or other piping. The toxic gas detoxifying removing means 70 preferably also includes a manifold 78 or other piping connector which routes gas removed from the interstitial space to either a reuse application, e.g., an auxiliary leak control ejection router 69, 69a, or to a detoxifying system, as understood by those skilled in the art, such as a scrubber tank 73 and/or a detoxifying or dechlorification unit 74 and a solution chiller 76. The toxic gas detoxifying removing means 70 also preferably includes a plurality of ball valves 77 and pressure gauges 79 for measuring pressure along different desired locations of the conduit 72a. At least one vacuum valve 71 is preferably connected to one or more locations in or around the manifold 78 as a stop-gap measure for also controlling leaks within the conduit 72. The leaked toxic gas, for example, can advantageously be withdrawn from the interstitial space 36a through the conduit 72 only having the leaked gas therein and then is injected into the conduit 72a having liquid, such as a mixture of water and sodium hydroxide, by the injector 78. The resulting injected liquid, e.g., a weak solution of sodium hyperchloride, is then circulated through the conduit 72a and can pass through the dechlorification unit 74 to further detoxify the liquid.

As also shown in FIG. 1, the system 10 can also include weight determining means 90 associated with the second container 30 for determining the amount of toxic gas removed from the first container 20 for use by weight. The weight determining means 90, for example, can advantageously be provided by bar scales 92 underlying the second container 30, a weight display 94 for displaying weight data or providing a scale readout to a system user, and a weight determining controller 95 connected to the bar scales 92 and the weight display 95 for controlling data representative of the weight and being displayed to a user. The weight determining controller 95, for example, can be provided by a computer which can be telephone accessed by a modem or other system for providing weight or other monitoring data for the system 10.

As perhaps best illustrated in the embodiments of FIGS. 2–3, the system 10 can further include the second container 30, 30' further having a first sealing material or sealing member 45 abuttingly contacting the lid 38 and the base 35 for sealing the lid 38 to the base 35. A second sealing material 46 can also abuttingly contacting outer peripheries of the openings 42, 44 and at least portions of the toxic gas use removing means 50 and the toxic gas detoxifying means 70 for sealing the same in the respective openings 42, 44 of the only one side wall 32 of the plurality of side walls 31, 32, 33, 34 of the base 35.

Advantageously, the first and/or second sealing materials 45, 46 can also include color changing means associated with each of the first and second sealing materials 45, 46 for visibly changing color responsive to contact with toxic gas when located in the inner chamber 36 of the base 35. For example, the sealing materials 45, 46 can include a color changing paint associated therewith that changes color responsive to contact with the toxic gas. Also, the sealing material can be impregnated with such a color changing substance or material.

The system 10 also preferably includes a system controller 80 for controlling various pump(s) 75 and leak sensors or detectors for the system 10. Preferably, one or more pressure sensors 71a are connected to the conduit 72 or adjacent the opening for the toxic gas detoxifying means for sensing leakage of toxic gas into the interstitial space 36a. Because of the location of and the use of a pressure sensor to detect or sense the leaked toxic gas, fewer openings are required in the side wall 32 of the second container 30. Accordingly, this advantageously reduces another location of a potential leak and provides advantageously provides increased or improved system control.

The controller 80 is preferably connected to the weight determining means 90, the pressure sensor or pressure sensing device 71a for sensing leakage of gas from the first container 20 into the inner chamber or interstitial space of the second container 30, a toxic gas leak detector 60 for sensing leakage of toxic gas outside of or exterior to the second container 30, and alarm generating means 65 associated with toxic gas detoxifying removing means 70 for generating an alarm, e.g., lights 66, horn 67, modem or telephone line 68, responsive to the pressure sensor 71a and to the toxic gas leak detector 60 exterior to the second container 30. The toxic gas leak sensor accordingly can also advantageously include external leak detectors 60 for detecting leakage outside of or exterior to the interstitial space or the conduits, as well as the one or more leak detectors 71a for detecting leakage within the interstitial space 36a, e.g., through the conduits, for providing redundancy or additional accuracy standards for the system 10.

A container 30 for containing toxic gas therein is also provided according to the present invention. The container preferably includes a base 35. The base 35 including a bottom 37 and a plurality of side walls 31, 32, 33, 34 connected to and extending upwardly from the bottom 37 so as to define an inner chamber 36 for positioning a tank 20 of toxic gas therein. Only one 32 of the plurality of side walls 31, 32, 33, 34 of the base 35 has a toxic gas removal region 39 associated therewith for both removal of toxic gas from the tank 20 and removal of any toxic gas leaking into the inner chamber 36. A lid 38 is preferably mounted to upper peripheries of the plurality of side walls 31, 32, 33, 34. The container 30 also preferably has a first sealing material or sealing member 45 abuttingly contacting the lid 38 and the base 35 for sealing the lid 38 to the base 35.

The container 30 can also include the toxic gas removal region 39 having only one opening 43 (FIG. 3) or a plurality of openings 42, 44 formed in the only one 32 of the plurality of side walls 31, 32, 33, 34 of the base 35. The container 30' illustrated in FIG. 3, for example, is primarily formed of a concrete material and is preferably molded or formed along a predetermined pattern or construction. A second sealing material 46 can abuttingly contact outer peripheries of the only one opening 43 or each of the plurality of openings 42, 44 for sealing the only one opening 43 or each of the plurality of openings 42, 44 of the only one side wall 32 of the plurality of side walls 31, 32, 33, 34 of the base 35. Also, the first and second sealing materials 45, 46 can include color changing means, as described above herein, associated with each of the first and second sealing materials 45, 46 for visibly changing color responsive to contact with toxic gas when located in the inner chamber 36 of the base 35. Additionally, the lid 38 can flexibly and abuttingly contact the first sealing material 45 for providing a flexible and secure seal with the base 35 when the lid 38 is in the closed position. The toxic gas within the tank 20 of toxic gas is preferably at a predetermined pressure, and the lid 38 preferably has a weight or retaining strength greater than the predetermined pressure within the tank 20 so that if toxic gas leaks from the tank, the toxic gas at the predetermined pressure is then advantageously confined to the inner chamber 36 of the container 30.

As illustrated in FIGS. 1–4, the present invention also advantageously includes methods of containing and handling toxic gas. A method of containing and handling a toxic gas preferably includes positioning a first container 20 having toxic gas stored therein within an inner chamber 36 of a second container 30 so that an interstitial space is formed around at least portions of the first container 20. The second container 30 preferably includes a base 35 and a lid 38 mounted to the base 35 when in a closed position. The base 35 has at least portions of the inner chamber 36 formed therein. The method also preferably includes removing toxic gas from the first container 20 through an opening 42 formed in the second container 30 for use related to an external application, removing toxic gas leaked from the first container 20 when located within the interstitial space of the second container 30, and detoxifying the removed toxic gas thereafter.

Another method of containing and handling a toxic gas preferably includes positioning a first container 20 having toxic gas stored therein within an inner chamber 36 of a second container 30 so that an interstitial space is formed around at least portions of the first container 20. The second container 30 includes a base 35 and a lid 38 mounted to the base 35 when in a closed position. The base 35 has at least portions of the inner chamber 36 formed therein. The method also preferably includes removing toxic gas from the first container 20 through an opening 42 formed in a side wall 32 of the base 35 of the second container 30 for use related to an external application and removing toxic gas leaked from the first container 20 when located within the interstitial space of the second container 30 through the same opening formed in the second container 30.

Still another method of containing and handling a toxic gas preferably includes positioning a first container 20 having toxic gas stored therein within an inner chamber 36 of a second container 30 so that an interstitial space is formed around at least portions of the first container 20. The second container 30 has a base 35 and a lid 38 mounted to the base 35 when in a closed position. The base 35 has at least portions of the inner chamber 36 formed therein. The method preferably also includes sensing leakage of toxic gas from the first container 20 into the interstitial space of the second container 30 and removing toxic gas leaked from the first container 20 responsive to the sensed leakage of toxic gas into the interstitial space of the second container 30 through at least one opening 42, 44 formed in the base 35 of the second container 30.

Many modifications and other embodiments of the invention will come to the mind of one skilled in the art having the benefit of the teachings presented in the foregoing descriptions and the associated drawings. Accordingly, it is understood that the invention is not to be limited to the illustrated embodiments disclosed, and that the modifications and embodiments are intended to be included within the spirit and scope of the invention as described in the foregoing specification and as defined in the appended claims.

That which is claimed:

1. A system for containing and handling a toxic gas, the system comprising:

a first container having toxic gas stored therein;

a second container including a base and a lid mounted to the base when in a closed position, the base having an inner chamber formed therein, the first container being mounted in the inner chamber so that an interstitial space is formed around at least portions of the first container, than interstitial space being initially substantially filled with a non-toxic gas; toxic gas sensing means for sensing toxic gas when located within said interstitial space;

toxic gas use removing means connected to the first container and extending through the second container for removing toxic gas from the first container for use;

toxic gas detoxifying removing means connected to the second container for removing toxic gas when located within the interstitial space of the second container and for detoxifying the toxic gas thereafter; and weight determining means associated with the second container for determining the amount of toxic gas removed from the first container for use by weight.

2. A system as defined in claim 1, wherein the base of the second container has a bottom and a plurality of side walls connected to and extending upwardly from the bottom so as to define at least portions of the inner chamber and a plurality of openings including at least a pair of openings formed in only one of the plurality of side walls, at least one opening for the toxic gas use removing means and at least one opening for the toxic gas detoxifying removing means extending through a respective one of the pair of openings.

3. A system as defined in claim 2, wherein the second container further includes a first sealing material abuttingly contacting the lid and the base for sealing the lid to the base and a second sealing material abuttingly contacting outer peripheries of the each of the plurality of openings and each of the toxic gas use removing means and the toxic gas detoxifying means for sealing the same in the plurality of openings of the only one side wall of the plurality of side walls of the base.

4. A system as defined in claim 3, wherein the first and second sealing materials include color changing means associated with each of the first and second sealing materials for visibly indicating leakage by visibly changing color responsive to contact with toxic gas when located in the inner chamber of the base.

5. A system as defined in claim 1, further comprising a toxic gas sensor associated with the inner chamber of the second container for sensing leakage of toxic gas from the first container into the inner chamber of the second container and alarm generating means associated with toxic gas detoxifying removing means for generating alarm responsive to the toxic gas sensor.

6. A system as defined in claim 1, wherein the toxic gas detoxifying removing means includes a detoxifying conduit having a first opening interfacing with the interstitial space, detoxification fluid pumping means associated with the detoxifying conduit for removing toxic gas from the interstitial space through the detoxifying conduit, and a detoxifying tank connected to the detoxifying conduit for receiving the toxic gas therein and detoxifying the same.

7. A system as defined in claim 6, wherein the toxic gas detoxifying removing means further includes removed gas weighing means for weighing the toxic gas removed from the second container so that the amount of gas by weight removed from the second container can be communicated to a user of the system, and wherein the detoxifying tank includes a detoxification material positioned therein for providing detoxification directly to the removed toxic gas.

8. A system as defined in claim 1, wherein the toxic gas use removing means includes a use conduit connected to the first container and extending through the second container and use removal pumping means associated with the use conduit for removing toxic gas from the first container through the use conduit to a user for a selected application.

9. A system as defined in claim 3, wherein the lid of the second container flexibly and abuttingly contacts the first sealing material for providing a flexible and secure seal with the base when the lid is in the closed position.

10. A system as defined in claim 1, wherein the toxic gas within the first container is at a predetermined pressure, and wherein the lid includes attaching means for attaching the lid to the base so that the lid closingly withstands pressure greater than the predetermined pressure within the first container so that if toxic gas leaks from the first container, the toxic gas at the predetermined pressure is confined to the inner chamber of the second container.

11. A system as defined in claim 1, wherein the weight determining means includes bar scales underlying the second container and a weight display associated with the bar scales for displaying the amount of toxic gas by weight remaining in the first container.

12. A system for containing and handling a toxic gas, the system comprising:

a first container having toxic gas stored therein;

a second container including a base and a lid mounted to the base when in a closed position, the base having an inner chamber formed therein, the first container being mounted in the inner chamber so that an interstitial space is formed around at least portions of the first container, the interstitial space being initially substantially filled with a non-toxic gas; toxic gas sensing means for sensing gas when located within said interstitial space;

toxic gas use removing means connected to the first container and extending through the second container for removing toxic gas from the first container for use; and toxic gas detoxifying removing means connected to the second container for removing toxic gas when located within the interstitial space of the second container and for detoxifying the toxic gas thereafter.

13. A system as defined in claim 12, wherein the base of the second container has a bottom and a plurality of side walls connected to and extending upwardly from the bottom so as to define at least portions of the inner chamber and a pair of openings formed in only one of the plurality of side walls, only one of the toxic gas use removing means and the toxic gas detoxifying removing means respectively extending through only one of the pair of openings.

14. A system as defined in claim 13, wherein the second container further includes first sealing material abuttingly contacting the lid and the base for sealing the lid to the base and second sealing material abuttingly contacting outer peripheries of the pair of openings and the toxic gas use removing means and the toxic gas detoxifying means for sealing the same in the pair of openings of the only one side wall of the plurality of side walls of the base.

15. A system as defined in claim 14, wherein the first and second sealing materials include color changing means associated with each of the first and second sealing materials for visibly indicating leakage by visibly changing color responsive to contact with toxic gas when located in the inner chamber of the base.

16. A system as defined in claim 12, further comprising a toxic gas sensor associated with the inner chamber of the second container for sensing leakage of toxic gas from the first container into the inner chamber of the second container and alarm generating means associated with toxic gas detoxifying removing means for generating alarm responsive to the toxic gas sensor.

17. A system as defined in claim 16, wherein the toxic gas detoxifying removing means includes a detoxifying conduit having a first opening interfacing with the interstitial space, detoxification fluid pumping means associated with the detoxifying conduit for removing toxic gas from the interstitial space through the detoxifying conduit, and a detoxifying tank connected to the detoxifying conduit for receiving the toxic gas therein and detoxifying the same.

18. A system as defined in claim 17, wherein the toxic gas detoxifying removing means further includes removed gas weighing means for weighing the toxic gas removed from the second container so that the amount of gas by weight removed from the second container can be communicated to a user of the system, and wherein the detoxifying tank includes a detoxification material positioned therein for providing detoxification directly to the removed toxic gas.

19. A system as defined in claim 18, wherein the toxic gas use removing means includes a use conduit connected to the first container and extending through the second container and use removal pumping means associated with the use conduit for removing toxic gas from the first container through the use conduit to a user for a selected application.

20. A system as defined in claim 19, wherein the lid of the second container flexibly and abuttingly contacts the first sealing material for providing a flexible and secure seal with the base when the lid is in the closed position.

21. A system as defined in claim 20, wherein the toxic gas within the first container is at a predetermined pressure, and wherein the lid includes attaching means for attaching the lid to the base so that the lid closingly withstands pressure greater than the predetermined pressure within the first container so that if toxic gas leaks from the first container, the toxic gas at the predetermined pressure is confined to the inner chamber of the second container.

22. A system as defined in claim 21, further comprising weight determining means associated with the second container for determining the amount of toxic gas consumed for use by weight.

23. A system as defined in claim 22, wherein the weight determining means includes bar scales underlying the second container and a weight display associated with the bar scales for displaying the amount of toxic gas by weight remaining in the first container.

24. A container for containing toxic gas therein, the container comprising:
    a base, the base including a bottom and a plurality of side walls connected to and extending upwardly from the bottom so as to define at least portions of an inner chamber for positioning a tank of toxic gas therein, only one of the plurality of side walls of the base having a toxic gas removal region associated therewith for both removal of toxic gas from the tank and removal of any toxic gas leaking into the inner chamber;
    a lid mounted to upper peripheries of the plurality of side walls; and
    a first sealing material abuttingly contacting the lid and the base for sealing the lid to the base; and
    wherein the lid flexibly and abuttingly contacts the first sealing material for providing a flexible and secure seal with the base when the lid is in the closed position.

25. A container as defined in claim 24, wherein the toxic gas removal region comprises a pair of openings formed in the only one of the plurality of side walls of the base.

26. A container as defined in claim 25, further comprising a second sealing material abuttingly contacting outer peripheries of each of the pair of openings for sealing the same in the pair of openings of the only one side wall of the plurality of side walls of the base.

27. A container as defined in claim 26, wherein the first and second sealing materials include color changing means associated with each of the first and second sealing materials for visibly indicating leakage by visibly changing color responsive to contact with toxic gas when located in the inner chamber of the base.

28. A container as defined in claim 24, wherein the toxic gas within the tank of toxic gas is at a predetermined pressure, and wherein the lid includes attaching means for attaching the lid to the base so that the lid closingly withstands a pressure greater than the predetermined pressure within the tank so that if toxic gas leaks from the tank, the toxic gas at the predetermined pressure is confined to the inner chamber of the container.

29. A method of containing and handling a toxic gas, the method comprising the steps of:
    positioning a first container having toxic gas stored therein within an inner chamber of a second container so that an interstitial space is formed around at least portions of the first container, the interstitial space being initially substantially filled with a non-toxic gas, the second container including a base and a lid mounted to the base when in a closed position, the base having at least portions of the inner chamber formed therein;
    removing toxic gas from the first container through an opening formed in the second container for use related to an external application;
    removing toxic gas leaked from the first container when located within the interstitial space of the second container; and
    detoxifying the removed toxic gas thereafter.

30. A method as defined in claim 29, further comprising determining the amount of toxic gas removed from the first container for use by weight.

31. A method as defined in claim 29, wherein the base of the second container has a bottom and a plurality of side walls connected to and extending upwardly from the bottom so as to define the at least portions of the inner chamber and a pair of openings formed in only one of the plurality of side walls, and wherein the steps of removing the toxic gas for use related to an external application and removing leaked toxic gas each include removing the toxic gas through the pair of openings.

32. A method as defined in claim 31, further comprising sealing the lid to the base with a first sealing material and sealing the only one opening of the only one side wall of the plurality of side walls of the base with a second sealing material.

33. A method as defined in claim 32, further comprising visibly indicating leakage of toxic gas by visibly changing color of the first and second sealing material responsive to contact with toxic gas located in the inner chamber of the base.

34. A method as defined in claim 29, further comprising sensing leakage of toxic gas from the first container into the inner chamber of the second container and generating an alarm responsive to the toxic gas being sensed.

35. A method as defined in claim 29, wherein the step of removing leaked toxic gas from the inner chamber includes removing toxic gas from the interstitial space through a detoxifying conduit and into a detoxifying tank connected to the detoxifying conduit and receiving the toxic gas within the detoxifying tank.

36. A method as defined in claim 35, wherein the step of removing leaked toxic gas further includes weighing the toxic gas removed from the second container so that the amount of gas by weight removed from the second container can be communicated to a user of the system, and wherein the detoxifying tank includes a detoxification material positioned therein for providing detoxification directly to the removed toxic gas.

37. A method as defined in claim 29, wherein the step of removing toxic gas for use related to an external application includes withdrawing toxic gas from the first container through a use conduit to a user for a selected external application.

38. A method of containing and handling a toxic gas, the method comprising the steps of:

positioning a first container having toxic gas stored therein within an inner chamber of a second container so that an interstitial space is formed around at least portions of the first container, the interstitial space being initially substantially filled with a non-toxic gas, the second container including a base and a lid mounted to the base when in a closed position, the base having at least portions of the inner chamber formed therein;

removing toxic gas from the first container through an opening formed in only one of a plurality of side walls of the base of the second container for use related to an external application; and removing toxic gas leaked from the first container when located within the interstitial space of the second container through the same side of the second container.

39. A method as defined in claim 38, further comprising determining the amount of toxic gas removed from the first container for use by weight.

40. A method as defined in claim 38, further comprising sealing the lid to the base with a first sealing material and sealing a pair of openings in the only one side of the base with a second sealing material.

41. A method as defined in claim 40, further comprising visibly indicating leakage of toxic gas by visibly changing color of at least the first sealing material responsive to contact with toxic gas located in the inner chamber of the base.

42. A method as defined in claim 38, further comprising sensing leakage of toxic gas from the first container into the inner chamber of the second container by a pressure sensor and generating an alarm responsive to the toxic gas being sensed by the pressure sensor.

43. A method of containing and handling a toxic gas for use in an external application, the method comprising the steps of:

positioning a first container having toxic gas stored therein within an inner chamber of a second container so that an interstitial space is formed around at least portions of the first container, the interstitial space being initially substantially filled with a non-toxic gas, the second container including a base and a lid mounted to the base when in a closed position, the base having the inner chamber formed therein;

sensing leakage of toxic gas from the first container into the interstitial space of the second container;

removing toxic gas leaked from the first container responsive to the sensed leakage of toxic gas into the interstitial space of the second container through an opening formed in the base of the second container; and detoxifying the removed gas thereafter.

44. A method as defined in claim 43, further comprising determining the amount of toxic gas removed from the first container for use by weight.

45. A method as defined in claim 43, further comprising sealing the lid to the base with a first sealing material and sealing the opening of the base with a second sealing material.

46. A method as defined in claim 45, further comprising visibly indicating leakage of toxic by visibly changing color of at least the first sealing material responsive to contact with toxic gas located in the inner chamber of the base.

47. A method as defined in claim 43, further comprising generating an alarm responsive to the toxic gas being sensed.

* * * * *